United States Patent [19]

Malcolm

[11] Patent Number: 4,526,262
[45] Date of Patent: Jul. 2, 1985

[54] INFLATABLE EVACUATION SLIDE

[75] Inventor: Bruce Malcolm, Kent, Wash.

[73] Assignee: The Garrett Corporation, Los Angeles, Calif.

[21] Appl. No.: 386,832

[22] Filed: Jun. 9, 1982

[51] Int. Cl.³ .............................................. B65G 11/10
[52] U.S. Cl. .................................. 193/25 B; 193/25 C; 182/48; 244/137 P
[58] Field of Search ................ 193/25 B, 25 C, 25 R, 193/25 A; 244/DIG. 2, 137 P; 182/48

[56] References Cited

U.S. PATENT DOCUMENTS

| | | | |
|---|---|---|---|
| 3,606,939 | 9/1971 | Summer et al. | 193/25 |
| 3,669,217 | 6/1972 | Fisher | 193/25 B |
| 3,897,861 | 8/1975 | Miller et al. | 193/25 |
| 3,944,023 | 3/1976 | Fisher | 244/137 P |
| 3,973,645 | 8/1976 | Dix et al. | 182/48 |

Primary Examiner—Jeffrey V. Nase
Assistant Examiner—Daniel R. Edelbrock
Attorney, Agent, or Firm—Albert J. Miller

[57] ABSTRACT

A sequenced, directional restraint system for an inflatable evacuation slide wherein three separate restraints are provided across the width of the fluid distensible member of the inflatable evacuation slide and a sequenced, directional method of deploying an inflatable evacuation slide from an elevated egress to a lower surface.

25 Claims, 11 Drawing Figures

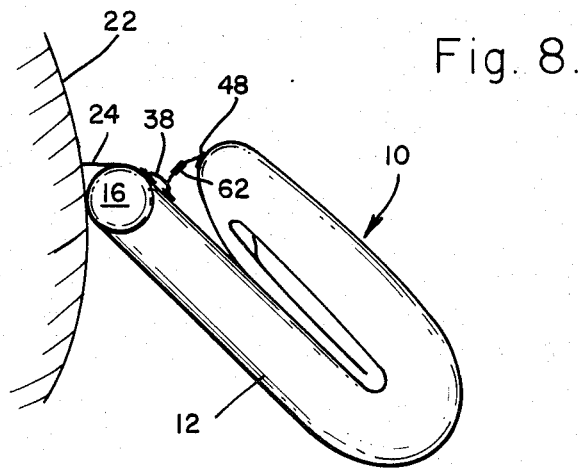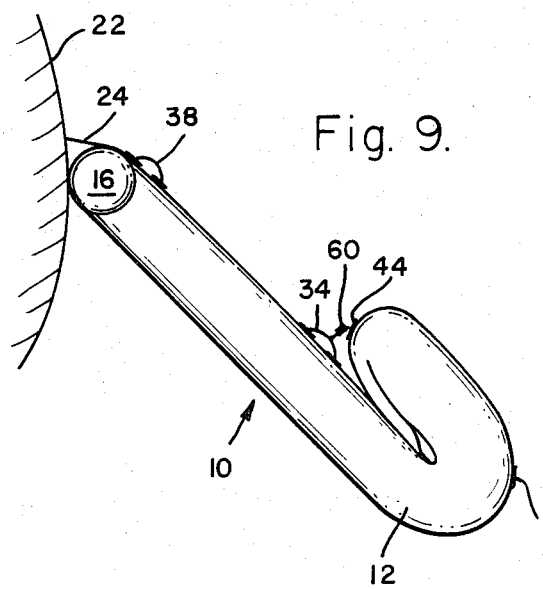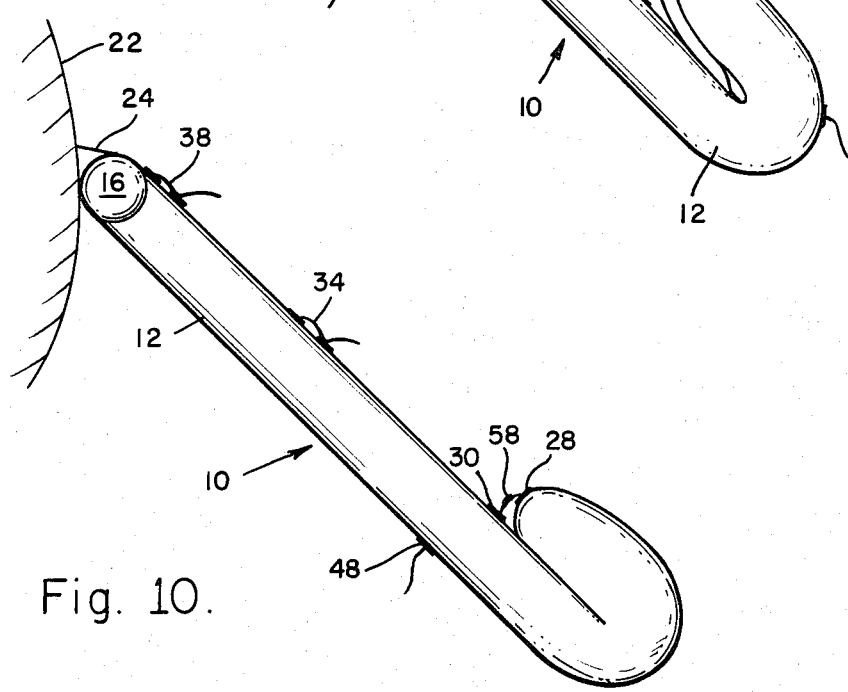

INFLATABLE EVACUATION SLIDE

BACKGROUND OF THE INVENTION

This invention relates to inflatable evacuation slides which are now installed on substantially all passenger-carrying aircraft to provide a means for rapid evacuation from the aircraft in the event of an emergency. These inflatable evacuation devices are normally folded in an uninflated condition into a pack requiring a minimum of space in the interior of the aircraft door or immediately adjacent thereto. With the aircraft door closed, a girt extending from the inflatable evacuation slide is connected to the floor inside the aircraft doorway such that in the event of an emergency it is only necessary to open the aircraft door to automatically deploy the slide. With the opening of the door, the girt will pull the evacuation slide from its container thereby allowing the slide to fall through the now open doorway. Subsequently, the evacuation slide is rapidly inflated and is then ready for the evacuation of passengers within a very short period of time following the opening of the door.

When an inflatable evacuation slide is initially deployed from an aircraft, it is necessary to restrain the slide from fully opening until at least some minimum inflation occurs. While only a short interval of time lapses between deployment of the slide and full inflation of the slide, various ambient wind conditions can prevent proper deployment unless suitable restraints are provided. Examples of such restraints are illustrated in U.S. Pat. Nos. 3,606,939 and 3,897,861. As faster deployment times are being required and more stringent wind conditions must be met, more directional control of the deployment of the slide is being considered. Also, while in the normal situation, the aircraft door is situated so that the inflatable evacuation slide can extend directly outward therefrom with the bottom of the slide resting on a lower surface to provide a straight-line sliding surface from the aircraft door to the lower surface, there are some situations in which it is desirable or even necessary to deploy the slide at an angle other than directly outward with respect to the aircraft door.

SUMMARY OF THE INVENTION

The present invention provides a restraint system and method for an inflatable evacuation slide which enables the slide to be deployed from an aircraft in a sequenced, directional manner in minimum time and without regard to wind conditions. A series of restraints are utilized to hold the slide in partially folded positions during the inflation thereof, releasing in a precise, predictable manner in response to ram forces or loads introduced from the inflation of the slide.

BRIEF DESCRIPTION OF THE DRAWINGS

FIG. 8 is a side elevation of the evacuation slide illustrating an initial partially inflated position held by the initial or primary restraints.

FIG. 9 is a side elevation of the evacuation slide illustrating an intermediate partially inflated position held by the intermediate restraints;

FIG. 10 is a side elevation of the evacuation slide illustrating a final intermediate partially inflated position held by the runway-end restraints.

DETAILED DESCRIPTION OF THE DRAWINGS

Figure 2:
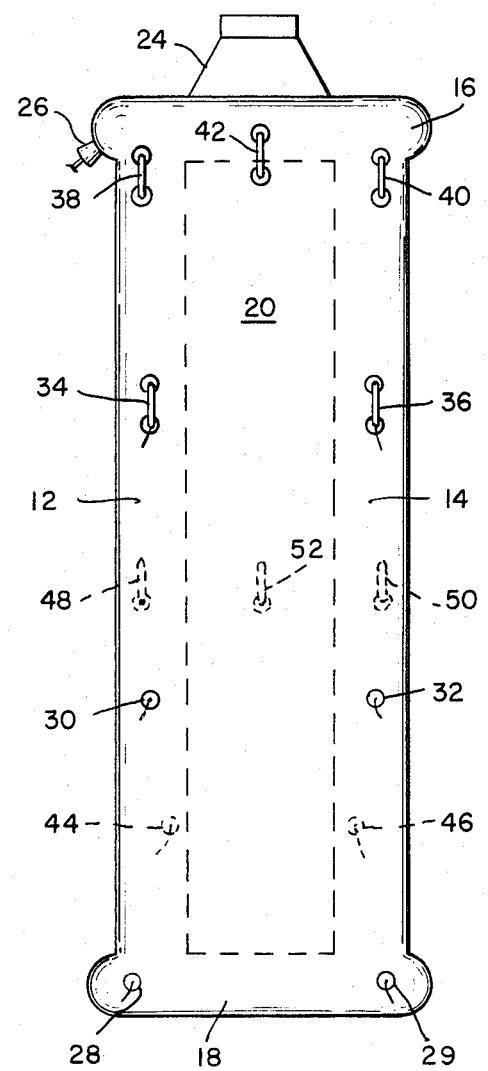
FIG. 2 is a top plan view of the evacuation slide of FIG. 1.
Figure 1:
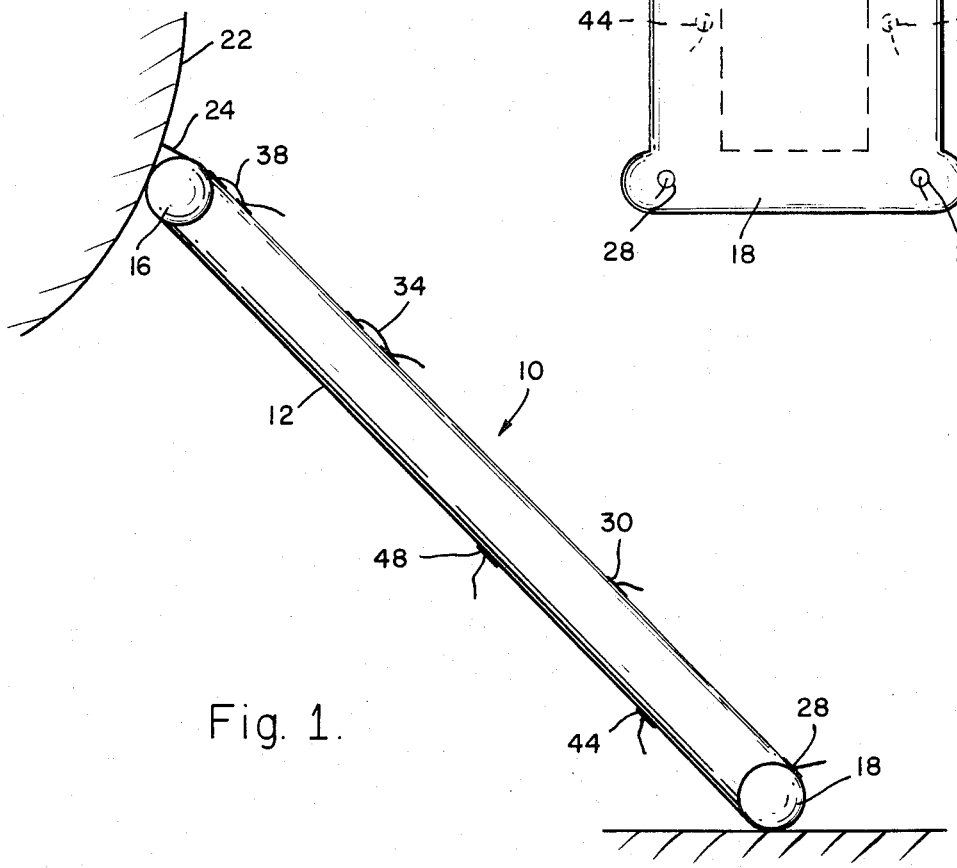
FIG. 1 is a side elevation view of the evacuation slide of the present invention shown fully inflated and deployed from an aircraft.

The inflatable evacuation slide 10 is shown in a fully inflated and deployed condition in FIGS. 1 and 2. The slide 10 generally comprises a fluid distensible beam structure having elongated side beams 12 and 14 together with a sill beam 16 and free or runway-end beam 18 over which a sliding surface 20 is disposed. The generally elongated rectangular slide structure is attached to the aircraft 22 by means of a girt 24 extending from the upper surface of the sill beam 16. The sill beam 16 or one of the side beams 12 or 14 also includes an aspirator 26 for inflation of the inflatable beam structure. The structural details of the fluid distensible beam structure, sliding surface and the inflation thereof, together with the attachment of the slide to the aircraft, are all conventional and well-known and hence will not be described in further detail in this application.

The upper surface of the evacuation slide 10 includes, at the runway-end thereof two runway-end restraints 28 and 29 which cooperate with two other runway-end restraints 30 and 32 which are disposed partially up the side beams 12 and 14 respectively. Disposed farther up the side beams 12 and 14 are intermediate restraints 34 and 36 respectively, while two outer primary restraints 38 and 40 and a central primary restraint 42 are disposed at the sill beam end of the slide 10.

Disposed along the underside of the evacuation slide 10 near the runway end thereof are intermediate restraints 44 and 46 which are positioned, when the slide 10 is folded, to cooperate with intermediate restraints 34 and 36 respectively. Disposed farther up the underside of the side beams 12 and 14 respectively are outer primary restraints 48 and 50 which are positioned to cooperate with outer primary restraints 38 and 40. Disposed on the underside of the sliding surface 20, between the outer primary restraints 48 and 50, is central primary restraint 52 which cooperates with central primary restraint 42.

Figure 3:
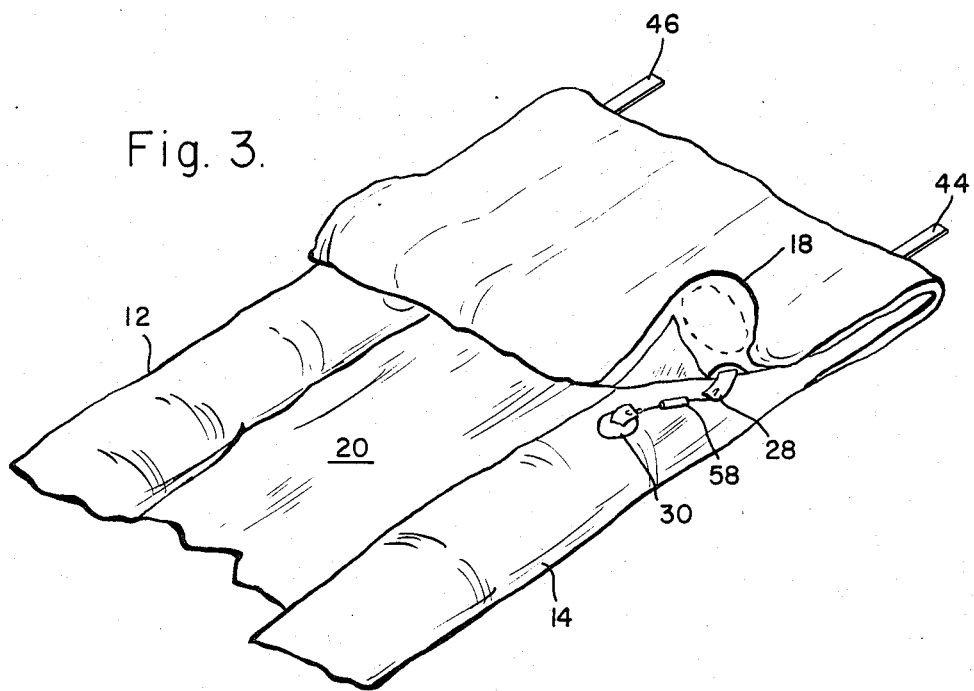
FIGS. 3, 4, and 5 are perspective views of the uninflated evacuation slide illustrating the sequential folding of the slide from its runway end and showing the runway-end restraints, intermediate restraints and the initial or primary restraints respectively.
Figure 4:
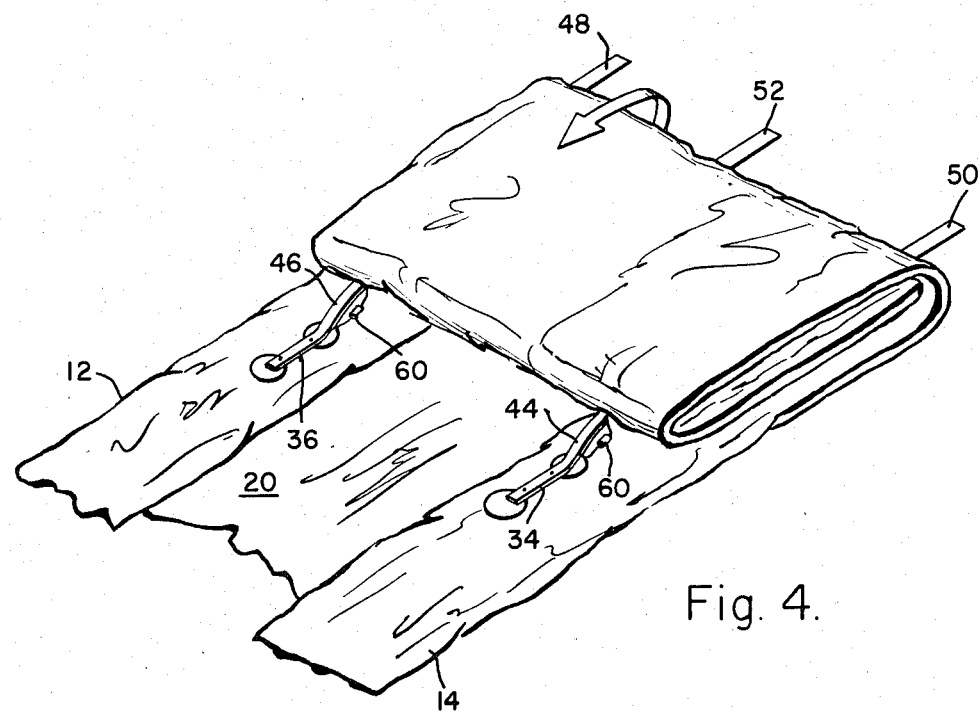
Figure 5:
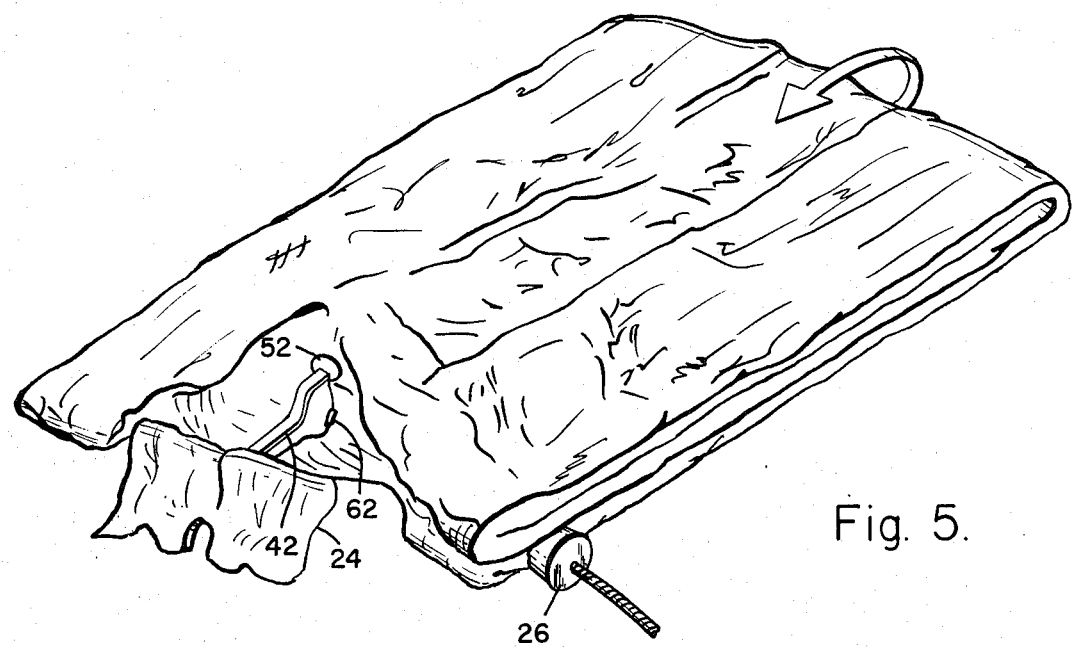

In order to more fully understand the deployment of the evacuation slide 10 and the restraint system therefore, reference is made to FIGS. 3, 4, and 5 which generally illustrate the folding of the uninflated evacuation slide 10. In addition, these figures generally illustrate the attachment of the restraints at each step of the folding procedures.

The first step of the folding procedure is illustrated in FIG. 3. The runway or free end of the slide 10, including runway-end beam 18, is placed over the top of the side beams 12 and 14 and runway-end restraints 28 and 29 on the runway-end beam 18 are attached to runway-end restraints 30 and 32 respectively. A frangible link 58 or other releasable or breakaway links such as the ball and spring loaded socket shown in FIG. 11 may be utilized to interconnect these restraints. Folding of the runway-end of the slide as shown in FIG. 3 exposes the intermediate restraints 44 and 46 on the underside of the side beams 12 and 14 respectively.

When the runway end of the slide is further folded over the top of the side beams 12 and 14, the intermediate restraints 44 and 46 can be joined to the intermediate restraints 34 and 36 on the top of these side beams as shown in FIG. 4. Folding the slide 10 in this manner exposes the primary restraints 48, 50, and 52 on the underside of the slide 10. As with respect to the runway-end restraints, the intermediate restraints are joined by means of a frangible or releasable link 60.

The final fold of the slide 10, for purposes of the restraining system, is to bring the bottom end of the partially folded slide up over the sill beam 16. In this manner, primary restraints 48 and 50 can be connected with primary restraints 38 and 40 and the central primary restraint 52 can be connected with central primary restraint 42. Each of these restraints are also connected by a frangible or releasable link 62.

Figure 6:
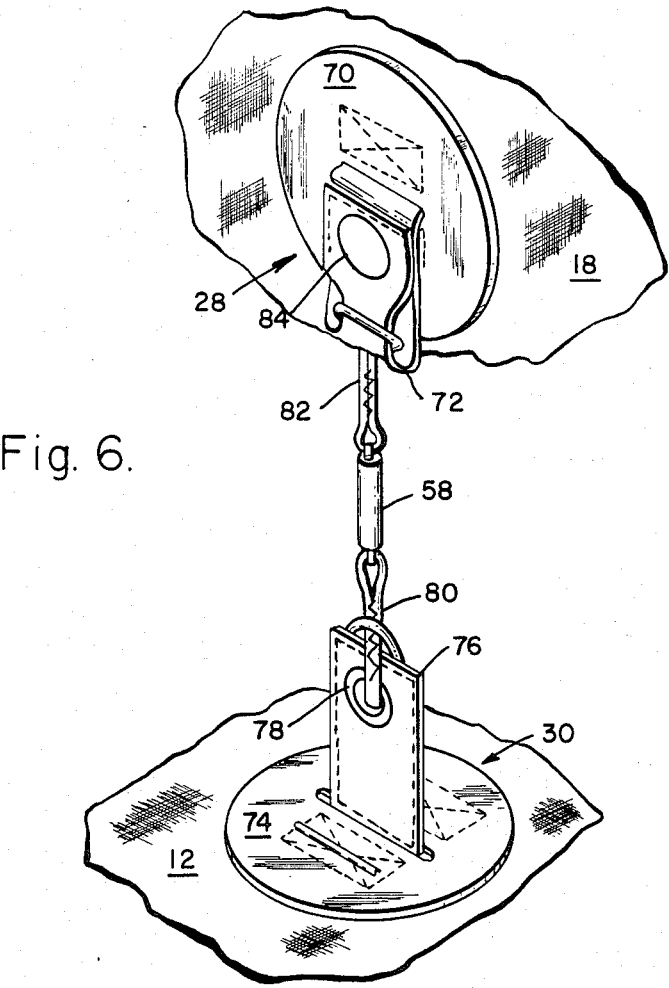
FIG. 6 is an exploded view of a runway-end restraint.

The attachment of the runway-end restraints is illustrated in more detail in FIG. 6. A circular patch 70, including an outwardly extending strap 72, is glued and/or stitched to the fabric of the runway-end beam 18. Likewise, a circular patch 74, having an outwardly extending strap 76, is glued and/or stitched to the fabric of the side beam 12. The end of the strap 76 includes a grommet 78 through which a cord 80 is looped with the frangible or releasable link 58 connected to one end of the cord 80. The other end of the link 58 is connected to a cord 82 which is looped around and through the strap 72 which is held together by a snap 84.

Figure 7:
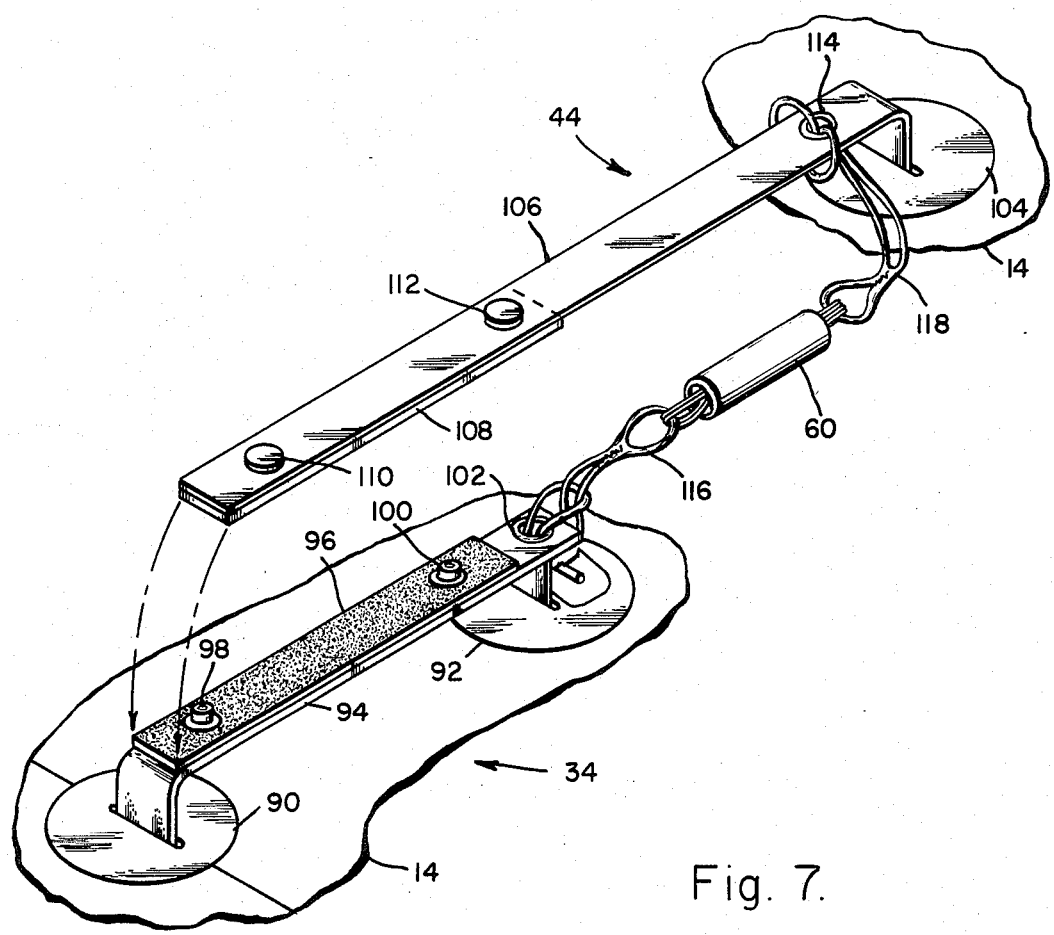
FIG. 7 is an exploded view of an intermediate or primary restraint.

The attachment of the intermediate restraints and the primary restraints is identical and is illustrated in detail in FIG. 7 with the numerals identified for the intermediate restraint only. The intermediate restraint 34 generally comprises two spaced apart circular patches 90 and 92 glued and/or stiched to the fabric of side beam 14. An elongated strap 94 is joined between the two patches 90 and 92. A Velcro patch 96 is disposed on the outer surface of the strap 94 which also includes a grommet 102 at one end thereof. Male snaps 98 and 100 are spaced apart on the upper surface of the Velcro patch 96. Intermediate restraint 44 generally comprises a circular patch 104 glued and/or stitched to the fabric on the underside of side beam 14. Strap 106 extends outward from patch 104 and includes at the outer end thereof a Velcro patch 108 and female snaps 110 and 112 spaced apart to cooperate with male snaps 98 and 100 on Velcro patch 96. A grommet 114 is provided near the base of strap 106. The frangible or releasable link 60 is loosely held between intermediate restraint 34 and intermediate restraint 44 by a cord 116 looped through grommet 102 in strap 94 and a cord 118 looped through the grommet 114 in strap 106.

In order to engage the restraints 34 and 44 the female snaps 110 and 112 on strap 106 are placed over male snaps 98 and 100 on strap 94 and the snaps are engaged. Velcro patch 108 on strap 106 is also engaged to Velcro patch 96 on strap 94 by pressing the Velcro patches together. After the snaps and Velcro is engaged, the link 60 is connected between the grommets 102 and 114 by means of the cords 116 and 118. While in FIG. 7 only the numbers for the intermediate restraints have been provided, as said previously the primary restraints are identical in all respects to the intermediate restraints and the numbers for the primary restraints could easily be substituted in FIG. 7 for the numbers of the intermediate restraints.

Figure 11:
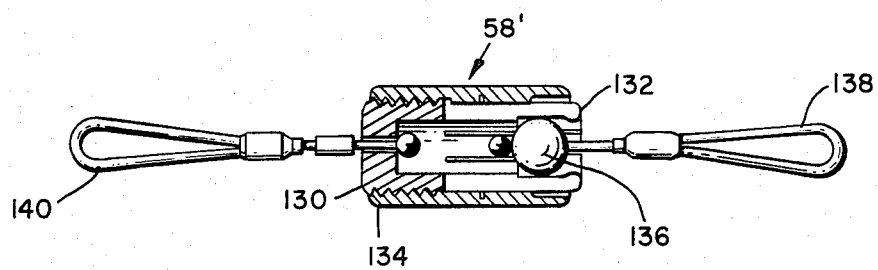
FIG. 11 is an enlarged sectional view of a ball and socket release link.

An example of a ball and socket release link 58' is shown in FIG. 11. The socket generally comprises an externally threaded cup-shaped base 130 with a plurality of outwardly extending fingers 132. A movable, internally threaded collar 134, engages the externally threaded base 130 and by its position over the fingers 132 controls the force exerted on the ball 136 which is held therebetween. Loops 138 and 140 are connected to the ball 136 and socket 130 respectively.

When the evacuation slide 10 is deployed from the aircraft 22, initial inflation of the slide 10 will be as generally shown in FIG. 8. The upper or sill end of the slide will be inflated first and the initial or primary restraints will hold the slide in the position generally shown in FIG. 8 until sufficient ram forces or loads are developed. The snaps and Velcro will serve to isolate the frangible or releasable link from random loads not associated with the ram loads or forces resultant from the inflation. The link thus will see only these ram loads and can be constructed to break or release at a precisely defined load condition.

Once this initial load condition has been achieved, the link 62 will break or release and the still partially inflated slide will assume the position generally shown in FIG. 9 where the slide is inflated over a greater portion of its length but is still held in a partially folded condition by the intermediate restraints.

Again as with respect to the primary restraints the Velcro and snaps of the intermediate restraints will isolate the link 60 from random loads such that again the link can be designed to break or release at a precisely defined ram load condition.

Once the ram load condition has been exceeded for the intermediate restraint links, the slide will then be inflated to the position generally shown in FIG. 10 where only the runway end of the slide is held by the runway-end restraints. Since at this point in time the ram loads are not as critical as with respect to the primary or intermediate restraints, there is no need for snaps or Velcro to isolate the ram loads from the runway-end restraints since at this point in time the slide is almost fully inflated. Breaking or releasing of the runway-end link 58 will permit completion of the inflation of the slide such that the slide will then be fully inflated or extended to the position as shown in FIG. 1 with the runway end thereof resting on a lower surface.

While the inflation or extension of the evacuation slide has been shown in three precisely defined steps requiring the fracturing or breaking or releasing of primary, intermediate, and runway-end links, it should be mentioned that the entire inflation of the slide will take place in a time frame of less than three seconds. Accordingly, the generation of loads and the breaking or releasing of links will be accomplished in a very short period of time. It is partly because of this short time involved that the precise control of the ram loads which will break or release these links is required, together with the uncertainties of the wind conditions which may be present when the slide is being inflated.

In order to provide directional control to the slide as it is deployed it has been found that the three primary links 62 across the width of the slide should have different breaking strengths or in other words be responsive to different levels of ram loads. For example, in order to direct the slide outward in a direction perpendicular from the aircraft the links for the outer primary restraints would be selected to break or release at the same load level while the link for the central primary restraint would be selected to break or release at a somewhat higher load level. It has been determined experimentally that the breaking or release point of the central primary restraint link should be between 10 to 20 percent higher than the breaking or release point for the links for the two outer primary restraints. For purposes of illustration if, the breaking load for the frangible links for the outer primary restraints is to be 150 pounds each, then the breaking point for the fragible link for the central primary restraint should be on the order of 170 pounds. In this manner both of the frangible links for the outer primary restraints will have been broken or released before the ram load is reached which is sufficient to break or release the frangible link for the central primary restraint. The slide will thus be positioned in a generally perpendicular direction extending outward from the aircraft at this critical stage during deployment thereof.

This is to be contrasted where only two frangible or releasable links are utilized during the deployment of an evacuation slide. In this instance, unless the links break or release at precisely the same instant, there will be some sideways directional force provided which may move the slide in one direction or the other from the perpendicular. When there are only two restraints, both would be selected and designed to release at exactly the same load. This may not, however, always be possible in the practical world of slide deployment during which the slide may be subjected to many extreneous forces other than ram load. Merely utilizing three restraints across the side would not solve the problem but would merely aggravate the situation if all three restraints were designed to release at the same load. It is only where the two outer restraints are released at a finite time before the central release is there the situation developed where there can be any certainty that the slide will deploy in a direction perpendicular to the aircraft.

If in a particular instance it is desirable to bias the slide in one direction or the other from the perpendicular direction from the aircraft, instead of providing the higher load frangible link in the central restraint, one side of the slide may be provided with the higher load frangible link such that the opposite side and the central restraint will include identical frangible links designed to break or release at a lower load condition. This can be further refined by having the frangible links graduated as to load response across each of the three primary restraints. In the first instance one side of the outer primary restraint and the central restraint might include frangible links selected to break at 150 pounds load while the other outer primary restraint would be selected to break at 170 pounds load. In the second instance, one of the outer primary restraint frangible links could be selected to break at 150 pounds load, the central primary restraint frangible link could be selected to break at 165 pounds of load, while the other outer primary restraint frangible link could be selected to break at 180 pounds of load. In each of these instances proper selection and arrangement of the frangible links and the loads at which they will break, can provide precise directional control to the deployment of the evacuaton slide and make the slide much less susceptible to wind conditions during its deployment.

While a number of specific embodiments of this invention have been illustrated and described, it is to be understood that these are provided by way of example only and that the invention is not to be construed as being limited thereto but only by the proper scope of the following claims.

What I claim is:

1. Inflatable slide apparatus for evacuation from an elevated egress to a lower surface, comprising:
   a fluid distensible member of a generally elongate configuration when fully inflated disposed in an uninflated folded configuration at the elevated egress with one end secured thereto; and
   means to restrain said fluid distensible member in a folded configuration during inflation thereof,
   said restraint means including three separate restraints across the width of said fluid distensible member, each restaint including, a first portion affixed to the upper surface of said fluid distensible member, a second portion affixed to the underside of said fluid distensible member, and a releasable link joining the first portion with the second portion of each restraint, said releasable link responsive to muscle forces generated by the pressurization of said member, and means to isolate each releasable link from random transient deployment forces,
   at least one of the releasable links having a release point at least 10% higher than the other two releasable links of said restraint means to deploy the fluid distensible member from said elevated egress in a directional manner.

2. The inflatable slide apparatus of claim 1 wherein the two outer links of said three releasable links have the same release point and the middle link of said three releasable links has a release point at least 10% higher than the two outer releasable links.

3. Inflatable slide apparatus for evacuation from an elevated egress to a lower surface, comprising:
   a fluid distensible member of a generally elongate configuration when fully inflated disposed in an uninflated folded configuration at the elevated egress with one end secured thereto; and
   means to restrain said fluid distensible member in a folded configuration during inflation thereof,
   said restraint means including three separate restraints across the width of said fluid distensible member, each restraint including, a releasable link therein responsive to muscle forces generated by the pressurization of said member, and means to isolate the releasable link from random transient deployment forces, the three releasable links having three different release points with one outer releasable link having a first release point, the middle releasable link having a release point at least 10% higher than the one outer releasable link and the other outer releasable link having a release point at least 10% higher than the middle releasable link.

4. The inflatable slide apparatus of claim 3 and in addition secondary means to restrain said fluid distensible member in a partially folded configuration following release of the three releasable links.

5. Inflatable slide apparatus for evacuation from an elevated egress hatchway of an aircraft to a lower surface upon which the aircraft is at rest, comprising:
   a fluid distensible member of a generally elongate configuration when fully inflated disposed in an uninflated, folded configuration at the elevated egress hatchway with one end secured adjacent said hatchway, said member including a free end fold, an intermediate fold and a primary fold;

first means to restrain said fluid distensible member in a folded configuration along the primary fold thereof during initial inflation thereof, said first means including three separate restraints generally equally spaced across the width of said fluid distensible member, each restraint including a releasable link therein responsive to muscle forces generated by pressurization of said member and means to isolate the releasable link from random transient deployment forces, at least one of the releasable links having a release point at least 10% higher than the other two releasable links of said first restraint means;

second means to restrain said fluid distensible member in an intermediate folded configuration along the intermediate fold thereof during subsequent inflation thereof; and third means to restrain said fluid distensible member in a free end folded configuration along the free end fold thereof during still subsequent inflation thereof.

6. The inflatable slide apparatus of claim 5 wherein said second restraint means includes a pair of restraints with each of said pair including a releasable link therein responsive to muscle forces generated by pressurization of said member and means to isolate the releasable link from random transient deployment forces.

7. The inflatable slide apparatus of claim 6 wherein said third restraint means includes a pair of restraints with each of said pair including a releasable link therein responsive to muscle forces generated by pressurization of said member.

8. Inflatable slide apparatus for evacuation from an elevated egress hatchway of an aircraft to a lower surface upon which the aircraft is at rest, comprising:

a fluid distensible member of a generally elongate configuration when fully inflated disposed in an uninflated folded configuration at the elevated egress hatchway with one end secured thereto, said member including a beam structure having a pair of elongated side beams, a hatchway sill beam, and a free end beam and a sliding surface disposed over said beam structure, said member also including a free end fold, an intermediate fold, and a primary fold;

first means to restrain said fluid distensible member in a folded configuration along the primary fold thereof during initial inflation of said distensible member, said first means including three separate restraints generally spaced across the width of said fluid distensible member, each of said three restraints including: a first portion affixed to the upper surface of said fluid distensible member at the sill end thereof and a second portion affixed to the underside of said fluid distensible member intermediate the length thereof, the first and second portions of the two outer restraints affixed to the elongated side beams and the first and second portions of the middle of said three restraints affixed to the sliding surface; a releasable link joining said first portion with said second portion of each restraint, said releasable link responsive to muscle forces generated by pressurization of said member, the two outer of said three releasable links having the same release point and the middle of said three releasable links having a release point at least 10% higher than the two outer releasable links; and means to isolate the releasable link from random transient deployment forces;

second means to restrain said fluid distensible member in an intermediate folded configuration along the intermediate fold thereof during subsequent inflation thereof after release of the first restraint means, said second means including two separate restraints with each restraint having: a first portion affixed to the upper surface of said fluid distensible member, one of each elongated side beam thereof, and a second portion affixed to the underside of said fluid distensible member, one on each elongated side beam thereof; a releasable link joining said first portion with said second portion of each restraint, said releasable link responsive to muscle forces generated by pressurization of said member; and means to isolate the releasable link from random transient deployment forces; and third means to restrain said fluid distensible member in a free end fold configuration along the free end fold thereof during still subsequent inflation thereof after release of the first and second restraint means, said third means including two separate restraints with each restraint including a first portion affixed to the upper surface of said fluid distensible member, one on each elongated side beam thereof, and a second portion affixed to the free end beam thereof, and a releasable link joining said first portion with said second portion of each restraint.

9. The inflatable slide apparatus of claim 3, 4, 5, 6, 7, or 8 wherein said releasable links are frangible.

10. The inflatable slide apparatus of claim 3, 4, 5, 6, 7, or 8 wherein said releasable links are reusable.

11. The inflatable slide apparatus of claim 10 wherein said reusable releasable links are a ball and spring loaded socket.

12. A method of deploying an elongated inflatable evacuation slide apparatus from an elevated egress to a lower surface, comprising the steps of:

securing one end of the uninflated, folded inflatable evacuation slide at the elevated egress;

inflating the evacuation slide;

restraining the evacuation slide in a folded configuration during inflation thereof with restraint means including three separate restraints across the width thereof, each restraint including a first portion affixed to the upper surface of the evacuation slide, a second portion affixed to the underside of the evacuation slide, and a releasable link joining the first portion with the second portion of each restraint, said releasable link responsive to muscle forces generated by the pressurization of the evacuation slide and means to isolate each releasable link from random transient deployment forces, at least one of the releasable links having a release point at least 10% higher than the other two releasable links.

13. The method of claim 12 wherein the two outer of said three releasable links have the same release point and the middle of said three releasable links has a release point at least 10% higher than the two outer releasable links.

14. A method of deploying an elongated inflatable evacuation slide apparatus from an elevated egress to a lower surface, comprising the steps of:

securing one end of the uninflated, folded inflatable evacuation slide at the elevated egress;

inflating the evacuation slide;

restraining the evacuation slide in a folded configuration during inflation thereof with restraint means including three separate restraints across the width thereof, each restraint including a releasable link therein responsive to muscle forces generated by the pressurization of the evacuation slide and means to isolate the releasable link from random transient deployment forces, the three releasable links having three different release points with one outer releasable link having a first release point, the middle releasable link having a release point at least 10% higher than the one outer releasable link and the other outer releasable link having a release point at least 10% higher than the middle releasable link.

15. The method of claim 14 wherein said releasable links are frangible.

16. The method of claim 14 wherein said releasable links are reusable.

17. The method of claim 16 wherein said reusable releasable links are a ball and spring loaded socket.

18. Inflatable slide apparatus for evacuation from an elevated egress hatchway of an aircraft to a lower surface upon which the aircraft is at rest, comprising:
a fluid distensible member of a generally elongate configuration when fully inflated disposed in an uninflated folded configuration at the elevated egress hatchway with one end secured thereto, said member including a beam structure having a pair of elongated side beams, a hatchway sill beam, and a free end beam, and a sliding surface disposed over said beam structure, said member also including at least a primary fold;

primary means to restrain said fluid distensible member in a folded configuration along the primary fold thereof during initial inflation of said fluid distensible member, said primary restraint means including three separate restraints generally spaced across the width of said fluid distensible member, each of said three restraints including; a first portion affixed to the upper surface of said fluid distensible member at the still end thereof and a second portion affixed to the underside of said fluid distensible member intermediate the length thereof, the first and second portions of the two outer restraints affixed to the elongated side beams and the first and second portions of the middle of said three restraints affixed to the sliding surface, a releasable link joining said first portion with said second portion of each restraint, said releasable link responsive to muscle forces generated by pressurization of said member, the two outer of said three releasable links having the same release point and the middle of said three releasable links having a release point at least 10% higher than the two outer releasable links, and means to isolate the releasable link from random transient deployment forces.

19. The inflatable slide apparatus of claim 1, 2, or 18 and in addition secondary means to restrain said fluid distensible member in a partially folded configuration following release of the three releasable links.

20. The inflatable slide apparatus of claim 1, 2, or 18, wherein said releasable links are frangible.

21. The inflatable slide apparatus of claim 1, 2, or 18 wherein said releasable links are reusable.

22. The inflatable slide apparatus of claim 21 wherein said reusable releasable links are a ball and spring loaded socket.

23. The method of claim 12 or 13 wherein said releasable links are frangible.

24. The method of claim 12 or 13 wherein said releasable links are reusable.

25. The method of claim 24, wherein said reusable releasable links are a ball and spring loaded socket.

* * * * *

UNITED STATES PATENT AND TRADEMARK OFFICE
CERTIFICATE OF CORRECTION

PATENT NO. : 4,526,262
DATED : July 2, 1985
INVENTOR(S) : Bruce Malcolm

It is certified that error appears in the above—identified patent and that said Letters Patent are hereby corrected as shown below:

Column 8, line 11, change "of" to --on--

Column 7, line 25, change "apair" to --a pair--

Signed and Sealed this

Eighth Day of October 1985

[SEAL]

Attest:

DONALD J. QUIGG

Attesting Officer

Commissioner of Patents and
Trademarks—Designate